United States Patent

[11] 3,579,233

[72] Inventor Herbert A. Raschke
 Greenbrae, Calif.
[21] Appl. No. 813,786
[22] Filed Jan. 27, 1969
[45] Patented May 18, 1971
[73] Assignee E. D. Bullard Company
 Sausalito, Calif.
 Continuation-in-part of application Ser. No. 571,779, Aug. 11, 1966, now abandoned.

[54] AMBIENT NOISE FREQUENCY RESPONSIVE AUDIBLE VEHICLE ALARM
 6 Claims, 4 Drawing Figs.
[52] U.S. Cl. .................................................... 340/384E

[51] Int. Cl. .................................................... G08b 23/00
[50] Field of Search .......................................... 340/384;
 179/1.2; 325/(Inquired)

[56] References Cited
 UNITED STATES PATENTS
 3,160,877 12/1964 Monomakhoff .............. 340/384(E)
 3,173,136 3/1965 Atkinson ...................... 340/384(E)

Primary Examiner—Richard Murray
Attorney—Townsend and Townsend

ABSTRACT: A vehicle alarm system which has an ambient noise sensor, an alarm signal generator, and a system responsive to the sensor for varying the output frequency of the generator so as to produce a warning signal that has a frequency other than the frequency of the ambient noise.

HERBERT A. RASCHKE
INVENTOR.

BY
*Townsend and Townsend*

AMBIENT NOISE FREQUENCY RESPONSIVE AUDIBLE VEHICLE ALARM

This application is a continuation-in-part application of the copending Pat. application bearing Ser. No. 571,779, filed Aug. 11, 1966, for "Audible Vehicle Alarm With Ambient Noise Compensation."

This invention relates to an audible alarm for vehicles and, more particularly, to such alarm that produces sn output signal having a frequency which differs from the frequency of the ambient noise in which the alarm is operated.

In order to afford safety to men employed about motor vehicles such as trucks, fork lift trucks, tractors and the like, mechanical and/or electrical alarm devices have been provided in the prior art. Such devices typically include a sounder or noise making device that produces a constant level signal when the vehicle is moved. Although such devices are satisfactory when operated in a particular ambient noise environment for which they are designed, they are not altogether satisfactory when operated in an environment having a greater or lesser ambient noise level than the noise level for which they are designed. If the ambient noise level is less than that for which the alarm is designed, the sound produced by the alarm is unnecessarily loud and bothersome to workmen. On the other hand, if the alarm is operated in an environment having a greater ambient noise level than that for which the alarm is designed, the workmen are likely not to hear the alarm and thus, are not warned of possible danger.

The present invention overcomes the disadvantages to which allusion has been made hereinabove by providing an audible alarm system having an ambient noise sensor and a system for varying the output level of the alarm sounder in proportion to the sensed ambient noise level. Therefore, an alarm signal is produced which has a level high enough to be heard so as to warn the workmen and which is no louder than necessary to provide such warning. Thus, safety without creation of an unnecessarily bothersome noise level is provided at all times by apparatus of the present invention.

The present invention provides a system that compensates for the fact that the frequency of ambient noise varies from one environment to another. For example, the frequency constituents of ambient noise present at a construction site at which dump trucks and bulldozers are in operation are different from the frequency constituents of ambient noise in a factory or assembly plant. The present invention provides, in combination with the above mentioned ambient noise sensor, an alarm signal generator that generates a varying frequency output signal. It has been found that by employing a warning signal having a varying frequency, the amount by which the level of the warning signal must exceed the level of the ambient noise is considerably reduced. Accordingly, the frequency of the alarm signal generator may be continuously varied without reference to the frequency of the ambient noise so that during each cycle, at least some of the frequencies generated are distinct from the frequencies found in the ambient noise. Alternatively, the frequency of the alarm signal generator may be varied in response to the audio frequencies detected in the ambient noise.

The specific embodiments of the invention to be described in more detail hereinafter include electroacoustic transducers and switching systems for operating the transducers on a time shared basis between an ambient noise sensing function and an alarm sounding function. During the period that the electroacoustic transducer is performing the sensing function, an electric signal having an amplitude proportional to the ambient noise level is generated and stored, and during the period that the electroacoustic transducer functions as an alarm sounder, the amplitude of the stored signal is used to adjust the gain of an amplifier in proportion to the sensed ambient noise level. The amplifier may be fed by a variable frequency oscillator so that it has as an output signal an audio tone of constantly varying frequency and of an amplitude proportional to and greater than the ambient noise.

Alternatively, means are provided for sensing the frequency of the ambient noise and generating a signal which is fed to the amplifier and has a frequency different from that of the ambient noise or, at least, from the frequency component which represents the major portion of the ambient noise level. The latter situation arises whenever the ambient noise covers a relatively broad frequency spectrum instead of a single frequency or a narrow frequency band. Broad frequency spectrums may be encountered in places where machinery emitting high frequency noise, such as metal working machinery, and low frequency muffled internal combustion engines are present. In practically all instances one of the noise emitters will contribute the major portion, e.g. more than 50 percent of the ambient noise level. For the purposes of this specification and the appended claims "frequency different (or distinct, etc.) from the frequency of the ambient noise" means, additionally, "a frequency different (or distinct, etc.) from the frequency of the major portion of the ambient noise."

The object, features and advantages of the present invention will be more apparent on referring to the following specification and the accompanying drawing in which.

Figure 1:
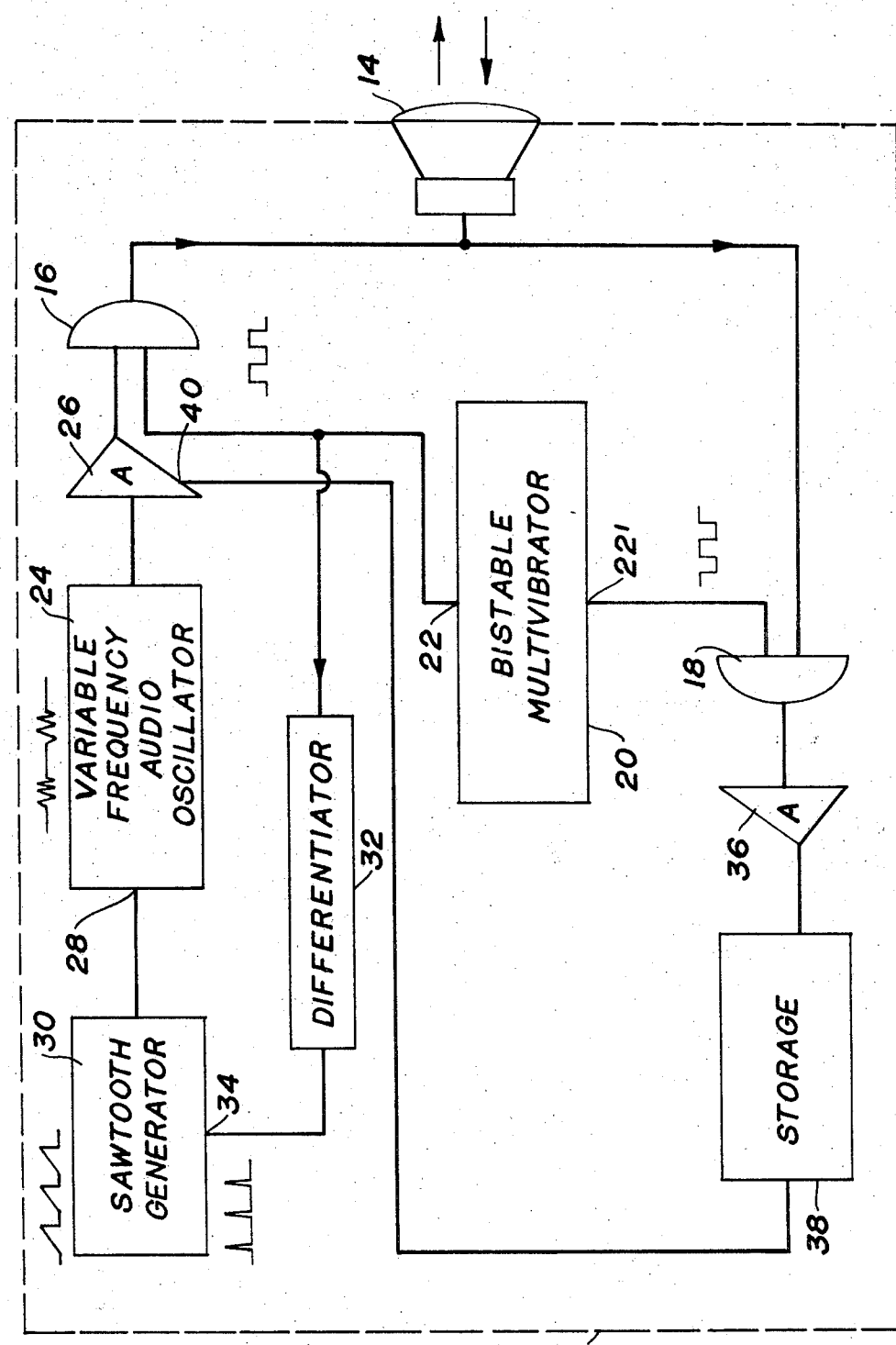
FIG. 1 is a block diagram of one embodiment of the alarm system of the present invention.

Referring more particularly to FIG. 1, reference numeral 12 indicates schematically a housing for the device which is mounted in a suitable location on the vehicle with which the alarm is used. Mounted on the casing in audio communication with the exterior thereof is a bidirectional electroacoustic transducer 14, such as a permanent magnet speaker. As is conventional, electroacoustic transducer 14 includes an acoustic structure such as a lightweight cone and an electric structure such as a voice coil. The cone and coil are so linked with one another that the cone will vibrate in accordance with the frequency of electric signals supplied to the voice coil and the voice coil will generate an electric signal corresponding to vibratory excitation of the cone. Connected to the electric structure of transducer 14 of a gate 16 that is adapted to couple to the transducer an alarm signal; gate 16 will be referred to hereinafter as a transmit gate. Also connected to the electric structure of transducer 14 is a second gate 28 which is adapted to be energized when transducer 14 serves as a sensor for ambient noise; gate 18 will hereinafter be referred to as a receive gate.

Transmit gate 16 and receive gate 18 are conventional and gates having plural inputs and a single output which conveys a signal only when all inputs are energized. For energizing the gates on a time shared basis a free-running, bistable multivibrator 20 is provided. Bistable multivibrator 20 is a conventional circuit that develops an electrical output signal having in alternation one or the other of two levels, the change in level recurring at periodic intervals. The bistable multivibrator has an output terminal 22 connected to transmit gate 16 and a complemental or inverted output terminal 22' connected to the input or receive gate 18. As is conventional, in a bistable multivibrator circuits output terminal 22 is the inverse of output terminal 22'. Thus the gates 16 and 18 are alternatively connected to transducer 14 and cooperate therewith on a time shared basis.

During the time interval that transmit gate 16 is conductive, an alarm sound is delivered to the environment from transducer 14 by excitation of the input thereof from the gate. For generating the alarm signal an audio oscillator 24 is connected through a variable gain amplifier 26 to the input of gate 16. Oscillator 24 and amplifier 26 are conventional circuit elements. The audio oscillator is capable of delivering a variable frequency output depending for example on the magnitude of the voltage at an input control terminal 28 thereof. To such input terminal is connected the output of a triggered sawtooth generator 30, a conventional circuit element well within the purview of the skilled artisan. The output of sawtooth generator 30, when the sawtooth generator is triggered, is a voltage signal of time-related increasing voltage, which voltage causes audio oscillator to produce an audio signal of correspondingly increasing frequency. Sawtooth generator 30 is triggered each time output 22 of a multivibrator 20 increases from a relatively low voltage state to a relatively high voltage state. The positive going portion of such output of the multivibrator is connected through a differentiator circuit 32 to input terminal 34 of the sawtooth generator. Consequently, each time the multivibrator 20 activates transmit gate 16, sawtooth generator 30 is pulsed and delivers its output signal to oscillator 24.

The ambient noise in the environment with which transducer 14 communicates is conveyed through receive gate 18 each time the output 22' of multivibrator 20 is in the relative positive state. Such noise level is transmitted through the gate and is amplified by a conventional amplifier 36. The level of the output of amplifier 36 is proportional to the intensity of ambient noise sensed by transducer 14 and such output is stored in a storage element 38, such as a storage capacitor. Storage element 38 is adapted to store the output of amplifier 36 for a time period equal to the period of the control signal produced by multivibrator 20. Such stored signal is supplied to control terminal 40 of variable gain amplifier 26, the latter amplifier being a conventional element and being adapted to amplify the signal applied to its input by an amount proportional to the level of signal applied to control terminal 40. Thus the gain of amplifier 26 is proportional to the ambient noise sensed by transducer 14.

Figure 2:
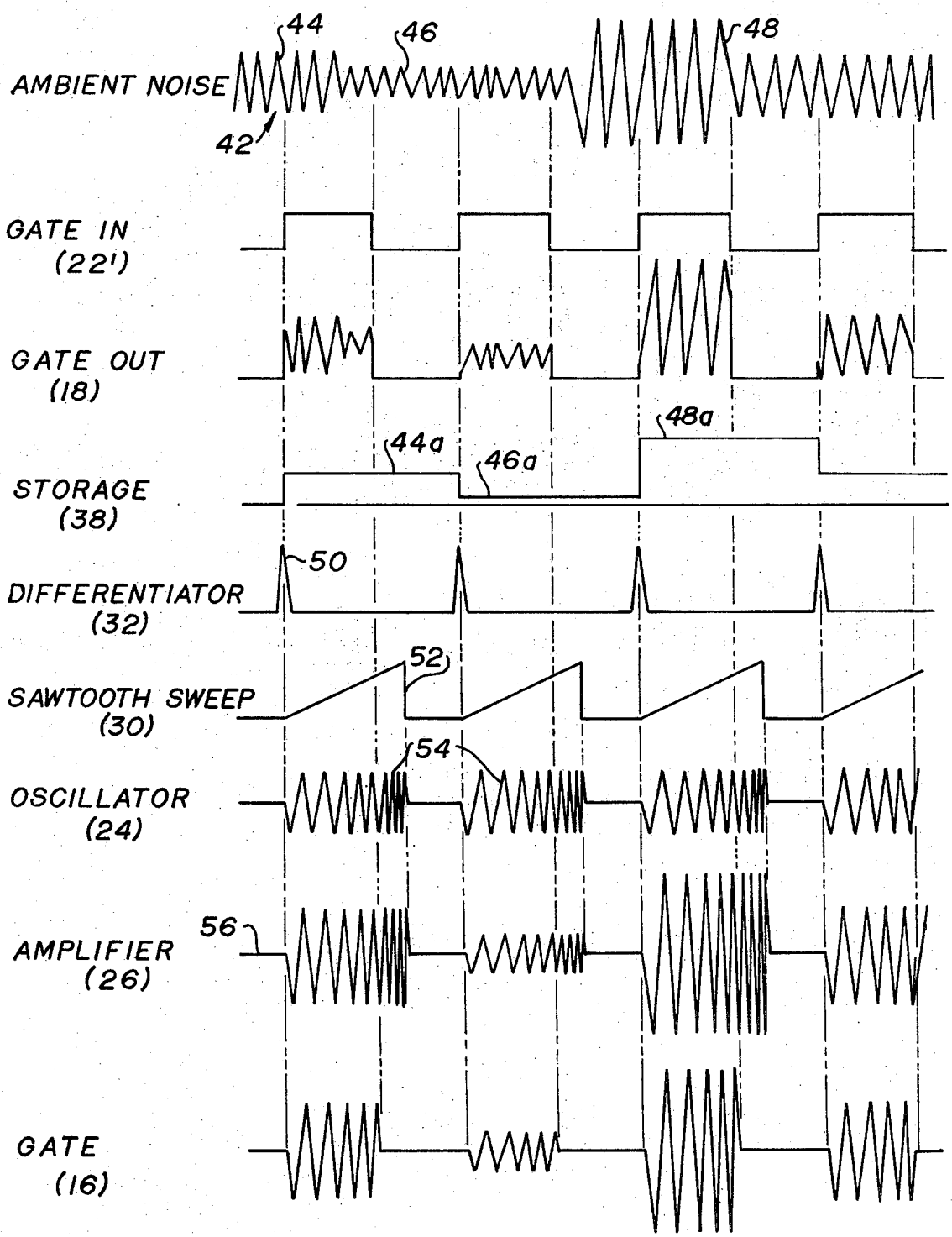
FIG. 2 is a plot of voltage versus time at various points in the system of FIG. 1.

A more specific appreciation of the operation of the present invention can be had by referring to FIG. 2. The uppermost curve 42 of FIG. 2 indicates ambient noise which typically includes a period of moderate intensity noise 44, a period of relative quietude 46, and a period of extremely loud noise 48. Transducer 14 senses such noise intermediate periods of excitation of the transducer from transmit gate 16, during which intermediate periods receive gate 18 is turned on or activated by multivibrator output 22'. Thus at the output of receive gate 18 are repetitive intervals wherein the output of the gate is proportional to the level of ambient noise. Such intervals are stored in storage element 38 in the form of a voltage level, the voltage level of moderate noise being designated as 44a, the voltage level of relative quietude being designated at 46a and the voltage level of extremely loud noise being indicated at 48a. Since the output of storage element 38 is connected to the gain control input terminal 40 of amplifier 26, the gain of that amplifier corresponds to the level of the stored signal. Thus when the amplifier is supplied with a signal from oscillator 24, the output thereof, and consequently the output of transducer 14, will correspond to and be louder than the ambient noise level.

For energizing the audio oscillator, differentiator 32 is provided to generate a pulse each time transmit gate 16 is turned on to the conductive state by the multivibrator. Such pulse is indicated at 50 and is connected to input terminal 34 of sawtooth generator 30. Each time the pulse occurs the sawtooth generator produces a voltage signal 52 which increases generally linearly with time. Because oscillator 24 is a variable frequency oscillator, i.e., an oscillator in which the output frequency is dependent upon the level of voltage applied to control terminal 28, the audio signal output of oscillator 24 is swept from a relatively low frequency, corresponding to the beginning of the sawtooth wave 52, to a relatively high audio frequency, corresponding to the later part of sawtooth wave 52. Such variable frequency output signal is indicated at 54. The audio signal is amplified by amplifier 26 by an amount proportional to the voltage level stored in storage element 38, which in turn, is proportional to the ambient noise sensed. The variation of the output level of amplifier 26 is depicted graphically at 56. Each time transmit gate 16 is turned on to the conductive state by multivibrator 20, such amplified audio signal is applied to transducer 14 and a warning signal is produced.

As can be seen the magnitude of the warning signal is proportional to the level of ambient noise present.

Apparatus according to the present invention is preferably designed to produce an alarm signal that is approximately 5 db. (decibel) above the level of the ambient noise sensed. Since ambient noise can reach a level of 105 db. or more at certain work sites amplifier 26 is designed to drive transducer 14 to produce a maximum sound level of about 110 db. or more. By way of example, a large grader pr like earth-moving vehicle might very well produce noise having an intensity of 105 db. A 110 db. alarm signal can be heard over such ambient noise level.

An alarm signal intensity of about 80—90 db. is not painful or unduly startling to men working in a relatively quiet environment, and so it is preferred that the minimum alarm signal produced by transducer 14 by such level irrespective of the amount by which the ambient noise is below such level. Many techniques for securing such minimum alarm signal will occur to those skilled in the art, for example, by application of a fixed bias voltage on input terminal 40 of amplifier 26 to which the voltage stored in storage element 38 is added when an alarm signal above 80—90 db. is required.

The loudness of the alarm signal produced by apparatus of the present invention not only exceeds the level of ambient noise but has a frequency distinct from the frequency of the ambient noise. In a noisy environment the noise is typically concentrated at a few more or less discrete frequencies. Because apparatus of the present invention produces an alarm signal having a continuously increasing frequency, an alarm signal is always produced that has frequency components distinct from the frequency components of the ambient noise. For example, it has been found that an audio frequency varying from about 200 cycles per second to about 3,000 cycles per second contains sufficient frequency components to be distinct from virtually any ambient noise condition. Provision of an audio oscillator 24 capable of such range is well within the capability of a skilled artisan.

In one alarm system designed according to the present invention the above-mentioned frequency variation is accomplished in one-half second, which time period is determined by the switching or repetition rate of multivibrator 20. In such exemplary system the multivibrator is symmetrical by which is meant the output thereof turns on transmit gate 16 for a period equal to and in alternation with the period that receive gate 18 is energized. In other words, the system is designed to sense ambient noise for one-half second and to generate an alarm signal during the subsequent one-half second period. Variation of the repetition rate of the output of multivibrator 20 can be readily accomplished to alter such timing sequence and for this reason in the exemplary system described in detail herein the sawtooth wave produced by sawtooth generator 30 in response to excitation at input terminal 34 is somewhat in excess of one-half second, as seen most clearly at 52 in FIG. 2.

The system shown in FIG. 1, although effective in attaining the desired result, contributes to an increase in overall noise level in the environment in which it operates. A modification of the invention, shown in FIG. 3, generates an alarm signal at a frequency distinct from the frequency of the ambient noise; such alarm can be heard without increasing the level thereof over the level of the ambient noise. Consequently, the overall noise level is not increased.

Figure 3:
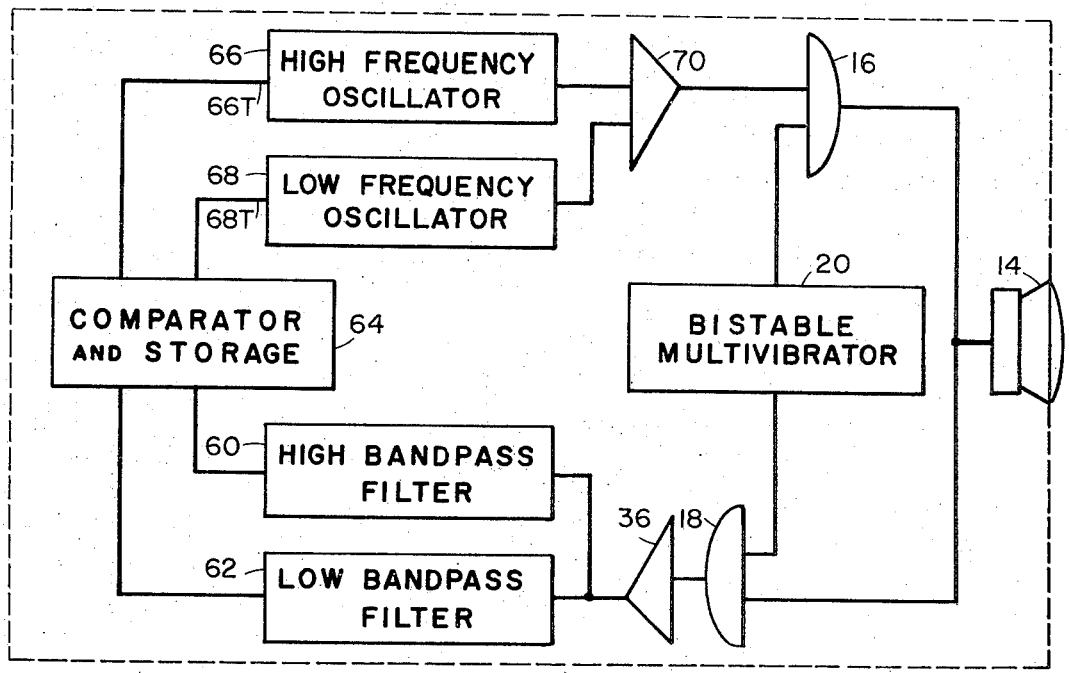
FIG. 3 is a block diagram of another embodiment of the alarm system of the present invention.

Referring to FIG. 3, an ambient noise frequency-responsive alarm device 59 is illustrated. The elements of the device which are identical to the elements utilized in the alternating frequency alarm device illustrated in FIG. 1 have the same reference numerals as in FIG. 1. When receive gate 18 is conducting, electric signals from transducer 14 are amplified at 36 and comprise the input signals to parallel high band and low band pass filters 60 and 62. Band pass filters are well known in the art and their detailed construction is therefore not set forth herein. The pass bands of filters 60 and 62 are distinct from one another to afford frequency separation of the ambient noise. For example, a filter 62 having a pass band of 500—1000 hz and a filter 60 having a pass band of 1000—2000 hz provides a system that affords satisfactory operation in most industrial locations. In systems where ambient noise is separated into only two bands, as is the case with the system of FIG. 3, filter 60 can be a high pass filter and filter 62 can be a low pass filter, the cutoff frequency of each being the same. Where, however, the ambient noise is separated into three or more bands, a corresponding number of unique band pass filters is required.

A comparator and storage device 64 receives the output signals from the two band pass filters 60, 62 and is in turn coupled to a high frequency oscillator 66 and a low frequency oscillator 68. The comparator can be any suitable electronic device, such as a bistable multivibrator which receives the output signals from the filters and compares their relative intensities. Depending on which one of the two output signals is stronger, as a result of the majority of the ambient noise level being in one or the other frequency band, the bistable multivibrator will be in one or the other of its two modes and thereby energize either the high or the low frequency oscillator, but not both. Comparator 64 is connected so that if the output signals from high band pass filter 60 have a greater magnitude than the signals from the low band pass filter 62, the low frequency oscillator 66 is energized. Alternatively, if the output signals from low band pass filter 62 are of a greater magnitude than the signals from the high band pass filter, then the multivibrator actuates high frequency oscillator 66 and deenergizes the low frequency oscillator. That is to say, a signal is produced that has a frequency distinct from the frequency prevailing in the ambient noise.

The output signals from the high or low frequency oscillators 66, 68 are fed through an amplifier 17 and hence to transmit gate 16.

Oscillators 66 and 68 are adapted to produce their respective output signals only when the input terminals, 66T and 68T, respectively, are excited by comparator and storage circuit 64. The frequency produced by high frequency oscillator is preferably within the frequency band passed by high band-pass filter 60; the frequency produced by low frequency oscillator is preferably within the frequency band passed by low band-pass filter 62.

Turning now to the operation of the variable frequency audible warning device illustrated in FIG. 3, bistable multivibrator 20 cofunctions with transmit gate 16 and receive gate 18 as described at the beginning of this specification. Thus, the two gates are in alternating conductive states. When receive gate 18 conducts, and transmit gate 16 is open circuited, the electric signals from transducer 14 are fed to the filters 60, 62 after amplification by amplifier 36. Each filter removes all signals having a frequency below or above, respectively, of the filter's threshold frequencies so that no input signals received by them from the transducer are lost. Depending upon the frequency of the ambient noise, or the frequency of the major portion of the ambient noise level, the output signal of one or the other of the filters will have greater magnitude. Accordingly, if comparator 64 comprises a bistable multivibrator, the multivibrator will be in one or the other of its two states, and either one or the other of the high and low frequency oscillators 66, 68 is energized. The output signals of the oscillators are fed to amplifier 70 but are prevented from reaching transducer 14 by the open circuited transmit gate 16.

During the next cycle of bistable multivibrator 20, receive gate 18 opens and transmit gate 16 closes, whereby the output signals from amplifier 70 are transmitted to transducer 14. The transducer generates an audible signal which has a frequency other than the frequency of the ambient noise. The magnitude of the audio signal may therefore be below the level of the ambient noise while persons within the danger area of the vehicle are warned since the different frequency audio signal can be heard and distinguished over the ambient noise.

The bistable multivibrator, which comprises comparator 64, remains in the state it was in during the previous cycle in which receive gate 18 conducted, acts as a storage for the prevailing signal received from filters 60, 62, and continues to energize the same oscillator 66 or 68 even after receive gate 18 opens and transmit gate 16 conducts. Signals of the desired frequency are thus transmitted to transducer 14 each time transmit gate 16 conducts.

Frequency-responsive warning device 59 may include means to increase the signal fed to transducer 14 in proportion to the ambient noise level. Amplifier 70 is then selected to be a variable-gain amplifier, which is suitably controlled in response to the ambient noise level as by storage element 38 shown in FIG. 1. In all other respects the frequency-responsive alarm device 59 is as described in the preceding paragraphs.

Figure 4:
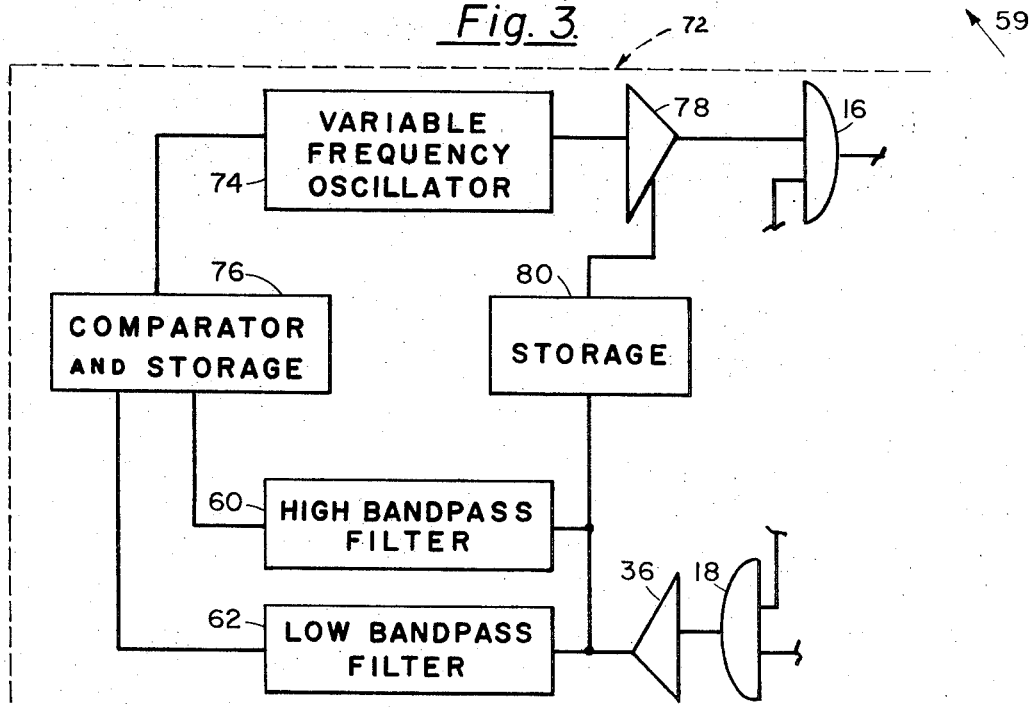
FIG. 4 is a fragmentary block diagram of yet another embodiment of the present invention.

Referring to FIG. 4, an ambient noise frequency-responsive warning device 72 is constructed to enable the variation of the audio frequency output of transducer 14 over a broad frequency spectrum. Device 72 is similar to the frequency-responsive warning device 59 illustrated in the FIG. 3 but includes a single variable frequency oscillator 74 to which the output from comparator 76 is fed. Variable frequency oscillator 74 is a conventional circuit that produces an AC output signal which has a frequency corresponding to the magnitude of the voltage applied to its input terminal 74T from comparator 76. Comparator 76 is electrically coupled with the high band- and low band-pass filters 60 and 62, which in turn receive their input from transducer 14 via receive gate 18 and amplifier 36.

Comparator 76 can be of any suitable construction, and can comprise the bistable multivibrator of comparator 64 of warning device 59. The variable frequency oscillator is connected to one of the output terminals (not shown) of the multivibrator and receives voltage signals of a magnitude which vary with the relative intensity of the output signals from the band-pass filters. The output signal from the variable frequency oscillator has a frequency other than the predominant frequency of the ambient noise; such output is fed to transducer 14 through amplifier 78 and transmit gate 16. Amplifier 78 can be a variable gain amplifier, in which case storage element 80, such as a storage capacitor, is provided, which provides the amplifier with a control signal fed to the storage element from the output side of amplifier 36, such control signal having a magnitude proportional to the magnitude of ambient noise.

Warning device 72 operates identically to warning device 59 except that it provides an audio signal which is variable within the frequency spectrum of the variable frequency oscillator 74. The variation is effected by adjusting the output voltage levels of comparator 76.

Although the systems described in connection with FIGS. 3 and 4 provide two distinct output signals, the invention is not to be considered as being limited to that number. For example, a system of the type shown in FIG. 3 can be adapted to divide ambient noise into three or more frequency bands and to produce alarm signals at three or more frequencies. Given the circuit descriptions hereinabove set forth, the skilled artisan can construct systems according to the invention that produce alarm signals at any reasonable number of distinct frequencies. Thus, it will be seen that the present invention provides an alarm system that is audible to workmen in virtually all ambient noise environments. The alarm signal produced may be held to a level just sufficient to be audible above the ambient noise, thereby avoiding excessively tiresome or startling signals. The variable frequency-responsive warning device of the present invention, however, permits the noise level of the warning device to be held below the ambient noise level, since audible signals of a frequency which differs from the frequency of the ambient noise are clearly audible. Because the system employs conventional and well-known circuit elements, it is capable of adjustment to accommodate specialized ambient noise environments which may be encountered in particular applications.

Although several embodiments of the present invention have been shown and described, it will be apparent that other adaptations and modifications can be made without departing from the true spirit and scope of the invention.

I claim:

1. Audible signal generating apparatus for a vehicle operated in the presence of ambient noise comprising means including an electroacoustic transducer for generating an audible signal, means sensing the frequency of the ambient noise, and electric signal generating means electrically coupled to said transducer and responsive to said frequency-sensing means, said signal generating means providing first electric signals as a function of the sensed frequency of the ambient noise causing said transducer to emit an audible signal responsive to the ambient noise and including at least one audio frequency component distinct from the frequency of the ambient noise.

2. Apparatus according to claim 1 wherein the generating means comprises electric frequency comparing means having a first output signal responsive to the frequency distribution of the ambient noise, and frequency-generating means electrically coupled to said comparing means and said transducer, and having a second output signal of a frequency distinct from the frequency of the ambient noise level.

3. Apparatus according to claim 2 wherein said frequency-generating means comprises means having a high frequency output and means having a low frequency output, and wherein said comparing means energizes one of said high and low frequency output means.

4. Apparatus according to claim 3, including means electrically coupled to said comparing means and to said transducer and separating second electric signals from said frequency sensing means into high and low band frequency electric signals, and wherein said comparing means is responsive to the relative magnitude of said high and low frequency signals.

5. Apparatus according to claim 1 wherein said frequency sensing means provides input signals for said signal generating means which are responsive to the relative intensity of the frequencies detected in the ambient noise, wherein said electric signal generating means includes means having a high audio frequency output, means having a low audio frequency output, means separating high frequency input signals from low frequency input signals, and means measuring the relative intensity of the high and low frequency inputs and actuating said means having the high audio frequency output in response to a greater intensity of the low frequency input signals, as compared with the high frequency input signals, and the means having the low audio frequency output in response to greater intensity of the high frequency input signals, as compared with the low frequency input signals, whereby the audible signal generated by said transducer has a frequency range distinct from the frequency of the ambient noise.

6. Apparatus according to claim 1 wherein the electric signal generating means includes means for generating variable frequency first electric signals, and means responsive to the frequency of signals received from the said frequency-sensing means for varying the frequency of said variable frequency signal generating means so that the frequency of the signals from the variable frequency signal generating means differs from the frequency of the ambient noise.